June 8, 1943.    H. B. BROWN    2,321,181
THERMOMETER
Filed July 17, 1941
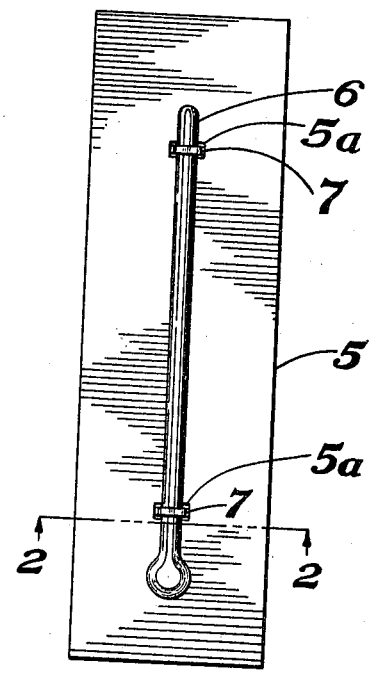
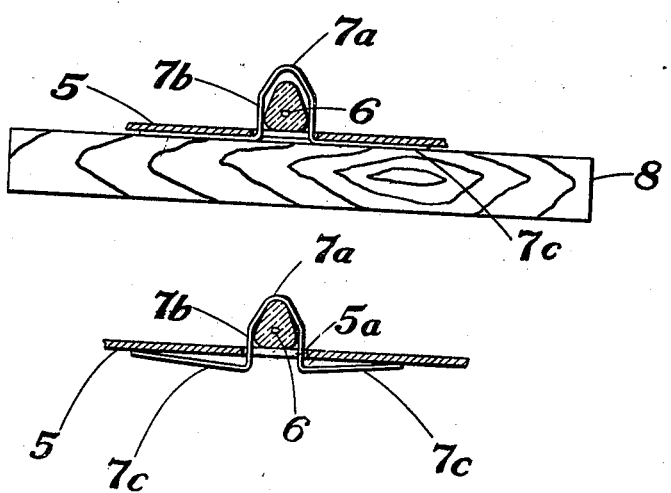
INVENTOR.
H. B. Brown
BY
D. Clyde Jones
ATTORNEY.

Patented June 8, 1943

2,321,181

UNITED STATES PATENT OFFICE 2,321,181

THERMOMETER

H. Brainard Brown, Rochester, N. Y., assignor to Taylor Instrument Companies, Rochester, N. Y., a corporation of New York Application July 17, 1941, Serial No. 402,775

3 Claims. (Cl. 73—376)

This invention relates to glass thermometers and more particularly to a novel thermometer construction and to a novel method of thermometer assembly.

In the manufacturing of glass thermometers, it has long been a problem to mount the thermometer tube on a back or a scale plate in such a manner that the tube will be securely retained thereon. Such retaining means which are known as clips or clasps, have end portions which must be securely anchored on the thermometer back or scale in such a manner that there are no exposed ends to catch on cleaning cloths or the like. Furthermore, such clasps should be readily applied even by an inexperienced operator.

In accordance with the main feature of the present invention, there is provided a novel arrangement for securing a thermometer tube to the thermometer back or graduated scale, as well as a novel method of assembling such a thermometer.

Various features and advantages of the invention will appear from the detailed description and claims when taken with the drawing in which:

Fig. 1 is a front view of the thermometer of the present invention;

Fig. 2 is a cross section of this thermometer taken substantially on the line 2—2 of Fig. 1; and Fig. 3 is a cross sectional view of the thermometer illustrating a stage in its assembly.

Referring to the drawing, the numeral 5 designates a thermometer back or graduated scale plate having spaced slots 5a formed therein. There is mounted on this scale plate in cooperate relation to the graduations thereon, a glass thermometer tube 6. This thermometer tube is retained in fixed assembled relation on the scale plate by suitable preformed clasps 7 having portions extending through the slots 5a to engage the thermometer stem.

Each slap 7 is generally W-shaped (Fig. 2), the center portion of which comprises a loop 7a and depending legs 7b adapted to be inserted through one of the mentioned slots 5a in the scale plate from the back of this plate. Each leg is provided with angular portions of spring arms 7c, reversely bent in the general direction of the loop portion 7a. The clasp is made of resilient material and preferably is made of tempered metal so that it will have a permanent set shape unless it is bent beyond its elastic limit.

In assembling the thermometer, the loop portion 7a of a clasp 7 is inserted from the rear of the scale plate 5 through each slot 5a therein. The scale plate with the loops 7a of the clasps thus inserted therethru, is placed with its rear surface on a flat support 8. The scale plate is then pressed toward the support (Fig. 3) to force the reversely bent end portions 7c of the clasp into a position parallel with the surfaces of the support and the plate. This causes the loop portion 7a of each clasp to project through the slot a greater distance than normal, and above the face of the scale plate. The upper end of the thermometer tube is then inserted through the two clasp loops 7a in succession until the tube is in proper relation to the graduations on the scale plate. Then the pressure on the scale plate is released and the resilience of each clasp causes its loop to draw the thermometer tube tightly against the front surface of the scale plate.

From the foregoing, it will be apparent that the assembling of such a thermometer requires no special skill on the part of the operator and yet all thermometers will be uniform in appearance and the thermometer tube will be securely mounted on its support.

I claim:

1. In a thermometer, a thermometer tube, a back for supporting said tube, said back having spaced slots therein, and a clasp of spring tempered material cooperating with each slot to bias said tube against said back, each clasp having spring arms to engage the rear surface of said back and having a loop of a size to be insertable through one of said slots as well as to embrace said tube.

2. In a thermometer, a thermometer tube, a support for said tube, said support having spaced slots therein, and clasps retaining said tube on said support, each clasp comprising a loop extending through a slot to embrace said tube at the front surface of the support and also comprising spring-like means engaging the rear surface of said support to bias said loop toward said support.

3. In a thermometer, a thermometer tube, a back for supporting said tube, said back having spaced slots therein, and a generally W-shaped clasp of resilient metal for each slot comprising a center loop and outer legs, the loop of each clasp being inserted and extending through each slot and embracing the tube on one side of the back, and the outer end portions of the legs engaging the other side of said back to resiliently hold the tube against the back.

H. BRAINARD BROWN.